(12) United States Patent
Prohaszka et al.

(10) Patent No.: US 11,524,663 B2
(45) Date of Patent: Dec. 13, 2022

(54) ADAPTIVE TRAILER OSCILLATION DETECTION AND STABILITY CONTROL

(71) Applicant: Lippert Components Inc., Elkhart, IN (US)

(72) Inventors: Thomas Herman Prohaszka, Armada, MI (US); David James Cattermole, Oakland Township, MI (US); John Peter Manfreda, St. Clair Shores, MI (US); Matthew Allen Collin, Ferndale, MI (US); Mark James Woloszyk, Oakland Township, MI (US); Paul Michael McCoy, Ferndale, MI (US)

(73) Assignee: LIPPERT COMPONENTS INC., Elkhart, IN (US)

(*) Notice: Subject to any disclaimer, the term of this patent is extended or adjusted under 35 U.S.C. 154(b) by 330 days.

(21) Appl. No.: 15/323,561

(22) PCT Filed: Jul. 8, 2015

(86) PCT No.: PCT/US2015/039567
§ 371 (c)(1),
(2) Date: Jan. 3, 2017

(87) PCT Pub. No.: WO2016/007636
PCT Pub. Date: Jan. 14, 2016

(65) Prior Publication Data
US 2017/0151935 A1    Jun. 1, 2017

Related U.S. Application Data

(60) Provisional application No. 62/043,236, filed on Aug. 28, 2014, provisional application No. 62/021,746, filed on Jul. 8, 2014.

(51) Int. Cl.
*B60T 7/20* (2006.01)
*B60T 8/17* (2006.01)
(Continued)

(52) U.S. Cl.
CPC ............... *B60T 7/20* (2013.01); *B60T 8/171* (2013.01); *B60T 8/176* (2013.01); *B60T 8/1708* (2013.01);
(Continued)

(58) Field of Classification Search
CPC ...................................................... B60T 8/248
See application file for complete search history.

(56) References Cited

U.S. PATENT DOCUMENTS 9,026,311 B1* 5/2015 Pieronek ............... B60W 10/18
280/455.1
2002/0095251 A1* 7/2002 Oh ........................... B60T 7/20
701/70

(Continued)

FOREIGN PATENT DOCUMENTS

DE        10225120 A1    11/2003
DE    102006030001 A1     1/2008
(Continued)

OTHER PUBLICATIONS

International Search Report and Written Opinion of the International Searching Authority for Patent Cooperation Treaty International Application No. PCT/US2015/039567 filed on Jul. 8, 2015, dated Sep. 28, 2015.

*Primary Examiner* — Imran K Mustafa
(74) *Attorney, Agent, or Firm* — Mechanicus PLLC

(57) ABSTRACT

A trailer oscillation and stability control device including an accelerometer and an angular rate sensor. An oscillation detection discriminator detects oscillatory lateral trailer motion in response to trailer displacement data derived from inputs from the angular rate sensor and acceleration signals received from the accelerometer, and then generates corresponding oscillatory event data. A brake controller generates (Continued)

a braking control signal in response to oscillatory event data received from the oscillation detection discriminator.

20 Claims, 7 Drawing Sheets

(51) Int. Cl.
*B60T 8/1755* (2006.01)
*B60T 8/171* (2006.01)
*B60T 8/176* (2006.01)
*B60T 8/24* (2006.01)
*B60T 17/22* (2006.01)
*G05B 6/02* (2006.01)

(52) U.S. Cl.
CPC ............ *B60T 8/1755* (2013.01); *B60T 8/248* (2013.01); *B60T 17/22* (2013.01); *G05B 6/02* (2013.01); *B60T 2201/06* (2013.01); *B60T 2230/06* (2013.01); *B60T 2270/10* (2013.01)

(56) References Cited

U.S. PATENT DOCUMENTS

| | | | | |
|---|---|---|---|---|
| 2008/0236269 | A1* | 10/2008 | Howell | B60T 17/221 73/121 |
| 2010/0168974 | A1* | 7/2010 | Bradley, IV | B60T 7/122 701/70 |
| 2010/0332049 | A1 | 12/2010 | Sy et al. | |
| 2011/0281564 | A1* | 11/2011 | Armitage | G07C 5/085 455/414.1 |
| 2012/0041659 | A1* | 2/2012 | Greene | B60D 1/30 701/70 |
| 2013/0124059 | A1* | 5/2013 | Funder | B60D 1/30 701/70 |

FOREIGN PATENT DOCUMENTS

| | | |
|---|---|---|
| DE | 102009008342 A1 | 9/2010 |
| EP | 1167141 A1 | 1/2002 |
| EP | 1593552 A1 | 11/2005 |
| GB | 2445649 A | 7/2008 |
| WO | 2007008150 A1 | 1/2007 |

\* cited by examiner

ADAPTIVE TRAILER OSCILLATION DETECTION AND STABILITY CONTROL

CROSS-REFERENCE TO RELATED APPLICATIONS

This application is a 371 national phase U.S. Non-provisional patent application, which claims the benefit of priority from Patent Cooperation Treaty International Patent Application No. PCT/US2015/039567 filed on Jul. 8, 2015, U.S. Provisional Patent Application No. 62/043,236 filed on Aug. 28, 2014, and U.S. Provisional Patent Application No. 62/021,746 filed on Jul. 8, 2014, the entire disclosures of which are incorporated herein.

BACKGROUND

Field

The invention relates generally to detection and control of vehicle trailer oscillation.

Description of Related Art Including Information Disclosed under 37 CFR 1.97 and 1.98

As a tow vehicle tows a trailer, the trailer can exhibit lateral oscillatory motion about a hitch pivot point, i.e., "fish-tailing", due to factors such as, but not limited, how the trailer is loaded, road conditions, speed of the tow vehicle, and/or wind gusts. The oscillatory motion can become severe to the point where trailer oscillations threaten loss of control of the trailer and, in extreme cases, the tow vehicle.

Oscillatory trailer motion can be controlled by applying trailer braking, but conditions such as rough road surfaces or railroad crossings can cause non-oscillatory lateral trailer motion about a hitch pivot point, which can be mis-identified as an "oscillation event" (oscillatory motion). Such a mis-identification can result in unnecessary trailer brake application, which results in reduced fuel economy for the tow vehicle and accelerated trailer brake wear.

There are a number of systems that are known in the art for use in detecting oscillatory trailer motion. Some such systems use a single sensor, such as an accelerometer, to detect lateral acceleration. If such a system receives sensor inputs indicating that a trailer has experienced a series of lateral accelerations exceeding a predetermined threshold value, or if the system receives a single sensor input indicating that a trailer has experienced a single lateral acceleration that exceeds a higher predetermined threshold value, the system will interpret the inputs as being indicative of oscillatory trailer motion. One issue with systems, such as these, that rely on inputs from a single sensor is that a single acceleration or a short-term series of accelerations may simply result from shocks imparted to a trailer by road conditions such as a rough road surface or a railroad crossing. Single sensor systems can improperly interpret such shocks as oscillation events.

To be able to determine and apply a brake control signal that will command an amount of braking force that is optimum for mitigating a trailer oscillation, it is preferable that the system know the weight of the trailer. Without knowing the weight of the trailer, a system may determine and apply a brake control signal that commands the application of either too little or too much braking force for optimum oscillation mitigation. To prevent this, a system can either be pre-set or calibrated for operation with only a certain class or classes of trailers of a known weight, or that fall within an acceptably narrow weight range.

Another well-known option for detecting trailer oscillation is to measure the angle a trailer makes relative to an imaginary tow vehicle centerline axis passing through a hitch carried by the tow vehicle, and to also measure the angular speed or rate at which the trailer is deflecting laterally about the hitch, and the angular acceleration. If the trailer length is known to the system, the system can use the trailer angle measurement to calculate a lateral displacement distance or angle, and can then determine thresholds at which to command engagement of the trailer brakes. One issue with this, however, is that it requires that the correct trailer length be calibrated or input into the system in advance. The other trailer oscillation detection and control systems mentioned above have similar limitations in that they each require some form of preliminary setting or calibration that takes into account trailer dynamics.

SUMMARY

A trailer oscillation and stability control device is provided comprising an accelerometer configured to measure lateral acceleration of a trailer and to generate corresponding trailer lateral acceleration signals, and an angular rate sensor configured to measure rate of angular trailer deflection about a hitch pivot point and to generate corresponding angular trailer deflection rate signals. An oscillation detection discriminator is coupled with the accelerometer and the angular rate sensor and is configured to detect oscillatory lateral trailer motion based on acceleration signals received from the accelerometer and angular trailer deflection rate signals received from the angular rate sensor, and to generate corresponding oscillatory event data. A brake controller is configured to generate a trailer braking control signal in response to oscillatory event data received from the oscillation detection discriminator.

A trailer oscillation detection method is provided comprising the steps of obtaining a trailer acceleration value from an acceleration signal received from an accelerometer carried by the trailer, deriving an angular trailer deflection value from an angular trailer deflection rate signal received from an angular rate sensor carried by the trailer; and determining whether the acceleration value and the angular deflection value exceed respective pre-determined threshold values.

DRAWING DESCRIPTIONS

These and other features and advantages will become apparent to those skilled in the art in connection with the following detailed description and drawings of one or more embodiments of the invention, in which.

DETAILED DESCRIPTION OF INVENTION EMBODIMENT(S)

The invention recited in the claims is not limited or constrained by what is presented in the following exemplary disclosure of one or more embodiments of adaptive trailer oscillation detection and stability control systems and methods. Other embodiments of the claimed device and method may be constructed and implemented within the scope of the claims. For purposes of this application, the term "oscillation event" will include trailer motion that occurs leading up to and during oscillatory trailer motion.

Figure 1:
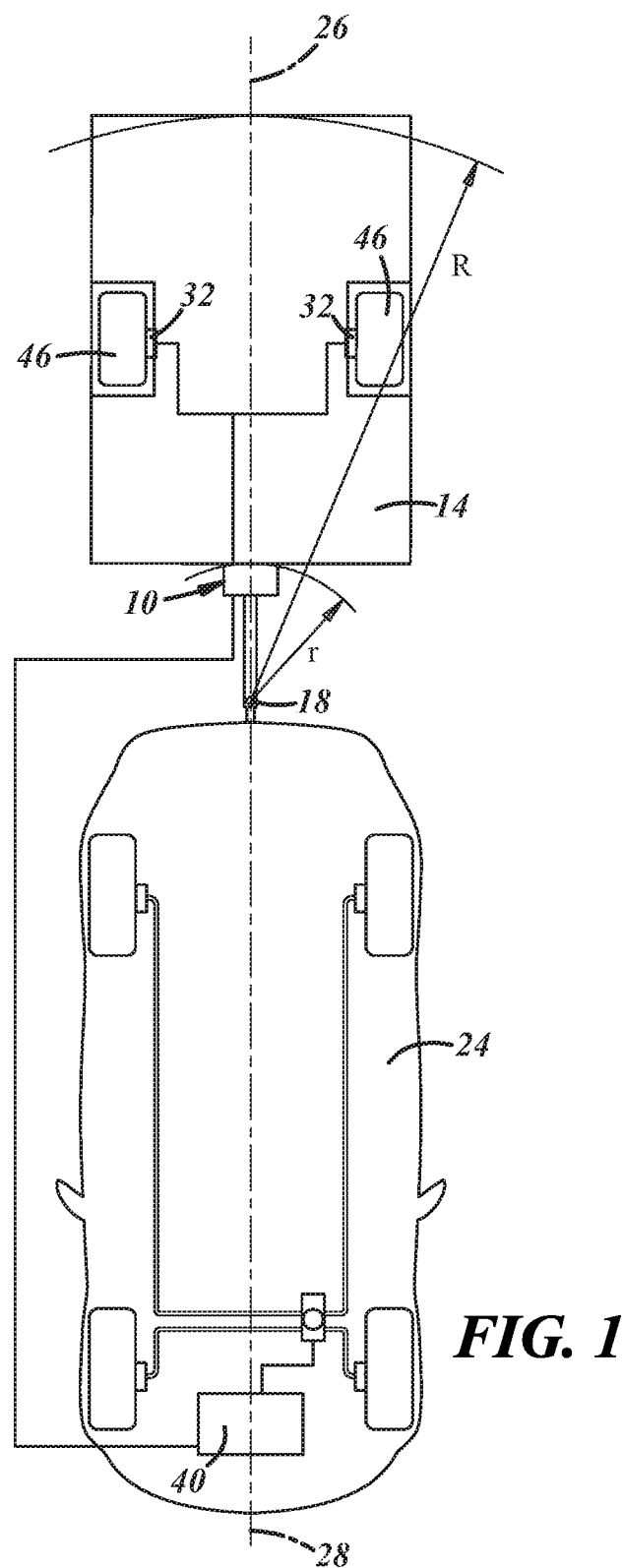
FIG. 1 is a schematic plan view of an illustrative embodiment of a trailer oscillation detection and stability control system connected between an external brake controller carried by a tow vehicle and wheel brakes of a trailer hitched to the tow vehicle, with the trailer shown positioned with its centerline axis shown aligned with that of the tow vehicle.
Figure 2:
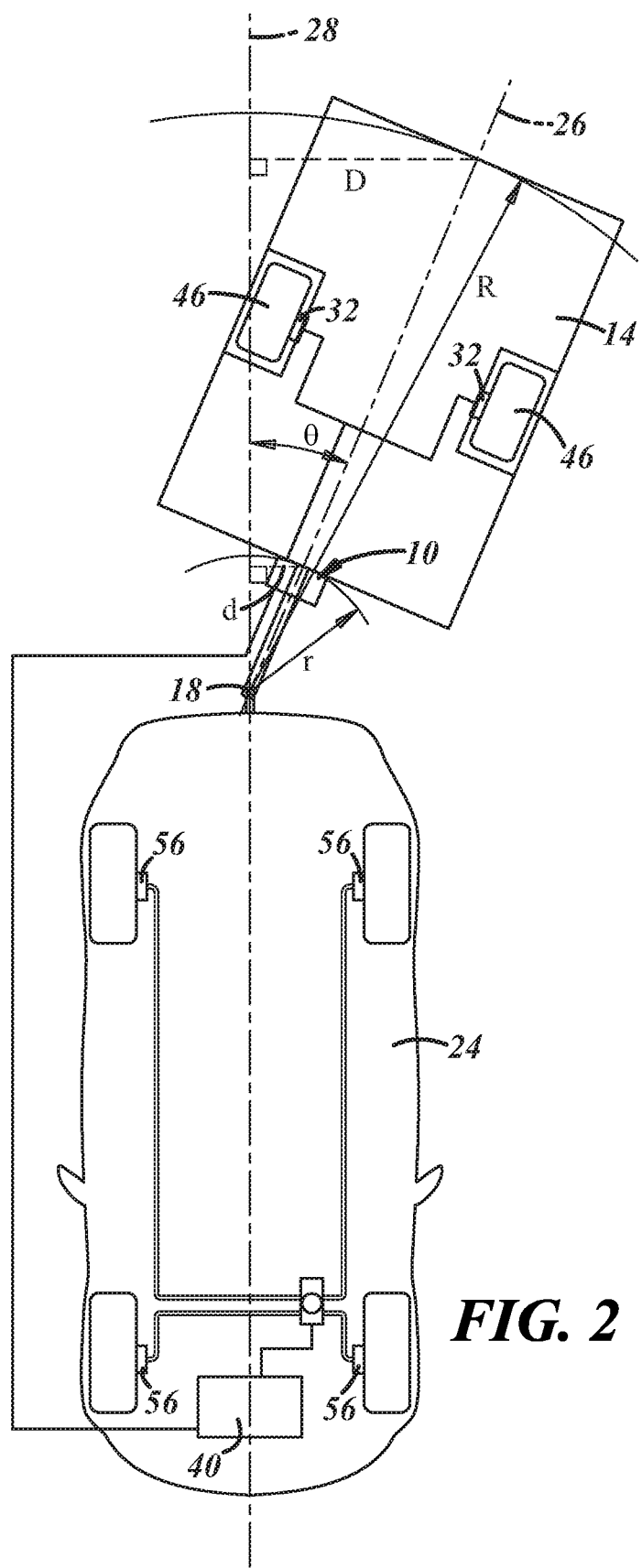
FIG. 2 is a schematic plan view of the trailer oscillation detection and stability control system, tow vehicle, and trailer of FIG. 1, with the trailer shown positioned with its centerline axis angularly displaced from that of the tow vehicle.
Figure 3:
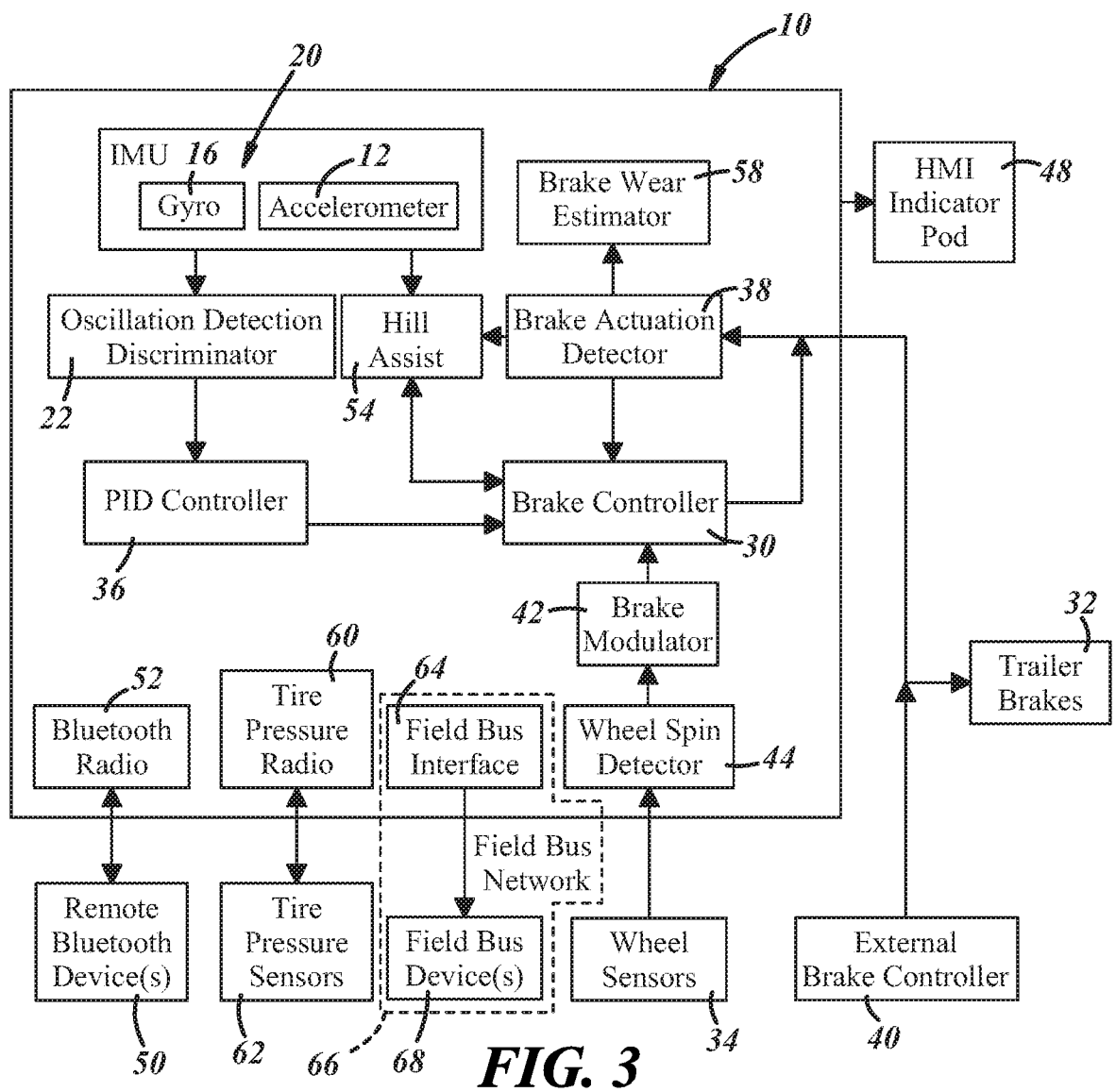
FIG. 3 is a schematic block diagram of the trailer oscillation detection and stability control system of FIG. 1.

An adaptive trailer oscillation and stability control device 10 is shown at 10 in FIGS. 1-3. As shown in FIG. 3, the device 10 may comprise an accelerometer 12 positioned to measure lateral acceleration of a trailer 14 and configured to generate corresponding trailer lateral acceleration signals, and an angular rate sensor 16 positioned and configured to measure rate of angular trailer deflection about a hitch pivot point 18 and to generate corresponding angular trailer deflection rate signals. The device 10 may include an inertial measurement unit (IMU) 20 that may comprise both the accelerometer 12 and the angular rate sensor 16.

As is also shown in FIG. 3, the device 10 also includes an oscillation detection discriminator 22 that is coupled with the accelerometer 12 and the angular rate sensor 16. As shown in the FIG. 4 flow diagram, the oscillation detection discriminator 22 is configured to detect oscillatory lateral trailer motion (or sway) based on acceleration signals received from the accelerometer 12 and angular trailer deflection rate signals received from the angular rate sensor 16, and to generate corresponding oscillatory event data. In other words, the oscillation detection discriminator 22 may be configured to use data received from the angular rate sensor 16 and the accelerometer 12 to distinguish between a trailer oscillation event and a non-oscillatory trailer excursion or lateral deflection. The oscillation detection discriminator 22 may be configured to detect oscillatory lateral trailer motion by obtaining trailer acceleration values from the acceleration signals received from the accelerometer 12, deriving angular trailer deflection values from the angular trailer deflection rate signals received from the angular rate sensor 16, and determining whether the acceleration values and angular deflection values exceed respective pre-determined threshold values. However, in other embodiments, the oscillation detection discriminator 22 may be further configured to take into account other measurements that may be derived from raw angular rate sensor 16 and accelerometer readings, and from predetermined criteria for those other measurements indicative of the occurrence of an oscillation event.

We can assume that the location of the device 10 relative to an imaginary centerline axis 28 of a tow vehicle 24 forms the radius r of a unit circle as shown in FIGS. 1 and 2. From trailer displacement rate information received from the angular rate sensor 16 one can determine a trailer angle $\Theta$ measured from a trailer centerline axis 26 to the tow vehicle centerline axis 28 as shown in FIG. 2. The trailer angle $\Theta$ can be expressed as a percentage angular deflection from 0 to 100%, with 100% representing an angular deflection of 90 degrees. A percentage angular deflection value equal to or in excess of a pre-determined percentage angular deflection threshold can then be used as one indication that the trailer 14 is experiencing oscillatory motion. However, using this method alone, a false oscillation determination could result where, for example, the tow vehicle 24 is slowly turning. Slow turns can result in percent angular deflections large enough to exceed a predetermined threshold value, even though no oscillatory motion is occurring.

The use of accelerometer data can be used to reveal such an event to be non-oscillatory because lateral acceleration will not exceed its predetermined threshold value. The accelerometer data may be collected by configuring and positioning the accelerometer 12 in a position where it can measure lateral angular accelerations of a trailer 14 that is deflecting laterally about a hitch pivot point 18 as shown in FIG. 2. The accelerometer 12 may be configured to detect both positive and negative trailer accelerations, i.e., lateral accelerations directed perpendicularly right and left, respectively, as the trailer centerline axis 26 is displaced angularly about a hitch pivot point 18 relative to the tow vehicle centerline axis 28 passing through the hitch pivot point 18.

During travel over rough terrain or other rough road conditions, the accelerometer 12 will perceive relatively small lateral accelerations and the angular rate sensor 16 will perceive angular or lateral trailer deflections. But the oscillation detection discriminator 22 can, upon receipt of that data, compare the small accelerations and deflections to the preset threshold values and, based on that comparison, recognize them as being indicative of non-oscillatory trailer motion.

Also shown in FIG. 3 is that the device 10 further includes a brake controller 30 that applies a braking control signal to wheel brakes, e.g., electric trailer wheel brakes 32, in response to oscillatory event data received from the oscillation detection discriminator 22. The brake controller 30 may be configured to send a brake activation signal to the trailer brakes 32 in response to only a single oscillatory event or, alternatively, in response to the occurrence of a predetermined number of oscillation events within a predetermined amount of time.

The brake controller 30 may command the trailer brakes 32 to engage for durations and magnitudes of braking force application determined in accordance with a predetermined maximum brake application duration value, a predetermined minimum brake application duration value, a maximum braking force value, a minimum braking force value, a data value obtained at least in part from the angular rate sensor 16, a data value obtained at least in part from the accelerometer 12, and/or a data value obtained at least in part from trailer wheel speed sensors shown schematically at 34 in FIG. 3.

Figure 5:
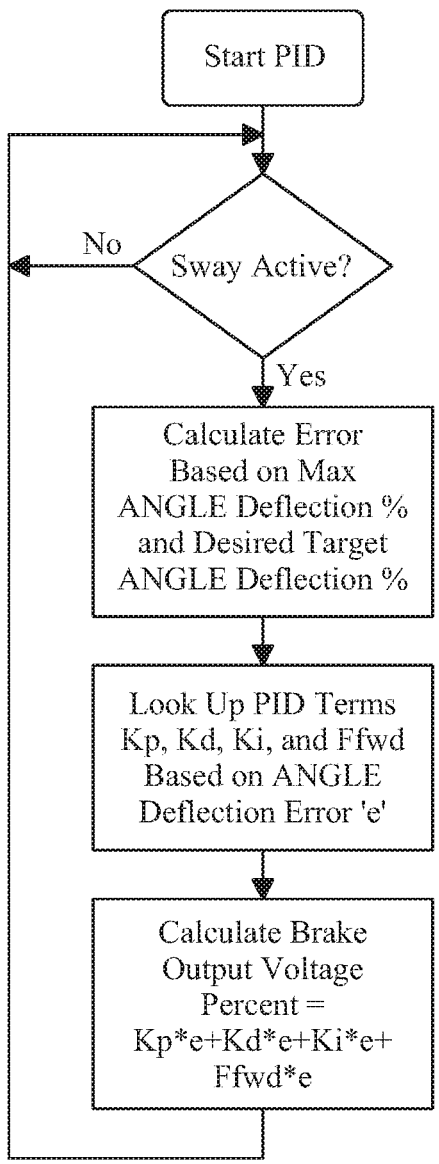
FIG. 5 is a flow chart showing a brake output percentage calculation process executable by the trailer oscillation detection and stability control system of FIG. 3.

As shown in FIG. 3, the device 10 may also include a proportional integral derivative (PID) controller 36 that may be connected between the oscillation detection discriminator 22 and the brake controller 30 so that, upon oscillation detection, the brake controller 30 can apply brake control using proportional integral derivative control as shown in the FIG. 5 flow diagram. The PID controller 36 may be configured to populate and amend feed-forward and gain tables using data available to the brake controller 30, and to configure the brake activation signal to command a trailer wheel brake system to apply trailer braking for durations and magnitudes of braking force calculated at least in part by referencing values stored in the tables. The PID controller 36 may be configured for dynamic tuned control of weighted proportional (Kp), integral (Ki), derivative (Kd), and feed forward (Ff) constants of the PID in response to vehicle dynamic response signals received from the IMU 20. A measured process value may be based on the percent displacement, with the desired set point reference fixed at a nominal percent. This allows the brake controller 30 to apply brake control based on appropriate gain tables, giving more aggressive control with larger displacement percent, and lighter control in response to a smaller displacement percent.

As is again shown in FIG. 3, the device 10 may comprise a brake actuation detector 38 that detects trailer brake control signals generated by an external brake controller 40 carried by a tow vehicle 24. The brake controller 30 of the device 10 may be configured to stop sending trailer brake control signals when the brake actuation detector 38 detects trailer brake control signals sent from the external brake controller 40.

Figure 6:
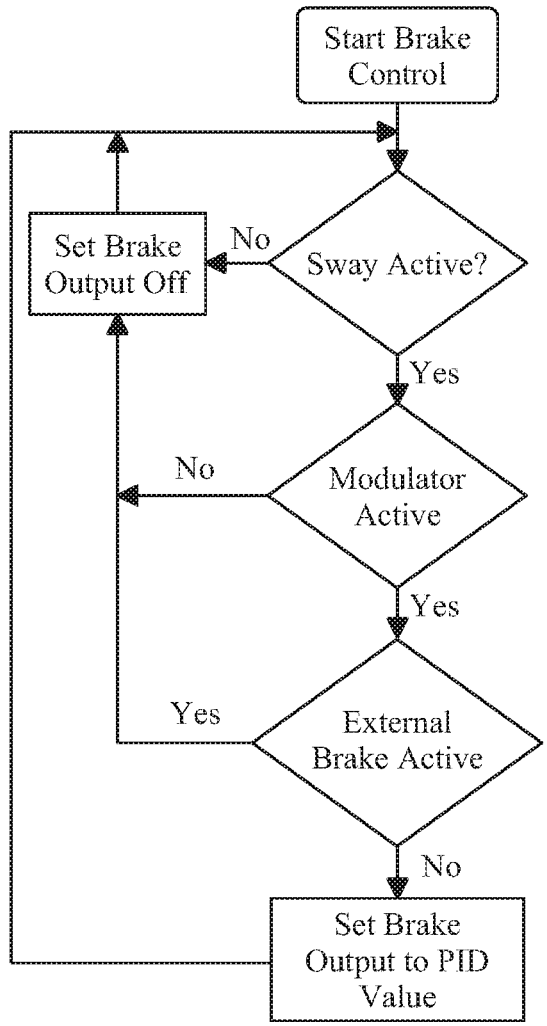
FIG. 6 is a flow chart showing a brake control process executable by the trailer oscillation detection and stability control system of FIG. 3.

The device 10 may include a brake output modulator, shown at 42 in FIG. 3, that may be connected to the brake controller 30 and configured to modulate trailer brake control signals in accordance with the FIG. 6 flow diagram to reduce the occurrence and/or severity of brake lockup by allowing mechanical slippage. As is also shown in the FIG. 6 diagram, the brake output modulator 42 may be configured to establish brake control gaps or "off time" between periods of brake control. This may be done to minimize potential lock up of wheels by allowing an electromagnet of an electric trailer brake 32 to slip.

Figure 9:
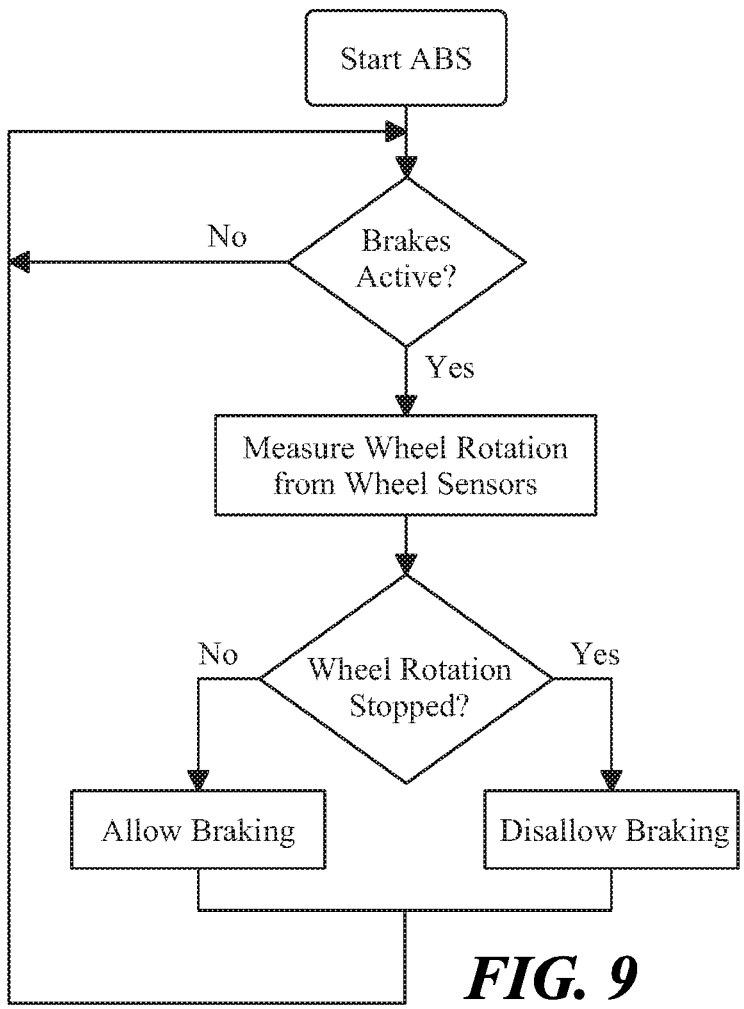
FIG. 9 is a flow chart showing an anti-lock trailer braking process executable by the trailer oscillation detection and stability control system of FIG. 3.

The device 10 may also include a wheel spin detector, shown at 44 in FIG. 3, that may be connected to the brake output modulator 42 and configured to receive trailer wheel spin data from trailer wheel speed sensors 34. As shown in the flow diagram of FIG. 9, the brake modulator 42 may be configured to provide anti-lock braking control in response to signals received from the wheel spin detector 44. In other words, the trailer wheel speed sensors 34 can be used to detect lack of trailer wheel rotation, and the brake modulator 42 and/or brake controller 30 may be configured to respond to the detected lack of rotation by reducing the brake control signal until wheel rotation resumes.

The device 10 may be configured to determine whether one or more trailer wheels 46 are locked by analyzing data received from the trailer wheel speed sensors 34. The device 10 may also be configured to prevent trailer wheels 46 from locking by adjusting braking control signals generated by the brake controller 30.

The device 10 may include a human-machine interface (HMI), which may, as shown in FIG. 3, comprise a remote HMI indicator pod 48. The HMI indicator pod 48 may be configured to blink or illuminate respective indicators to indicate when oscillation is detected, when there are issues with the system, and/or whether or not the unit is operating properly. The HMI indicator pod 48 may be one of several remote devices 50 configured for Bluetooth® (LE) capability, and the adaptive stability control device 10 may comprise a Bluetooth® radio 52 to allow for communications between the device 10 and the pod 48. The HMI may be configured for Bluetooth® Low Energy RF (BLE) capability. Since BLE is available in many known wireless end devices, custom services and characteristics can be created to communicate with an operator; and settings, events, and other notifications can be readily communicated.

The device 10 may be configured to perform automatic orientation calibration to allow the device 10 to be installed in various locations.

Figure 7:
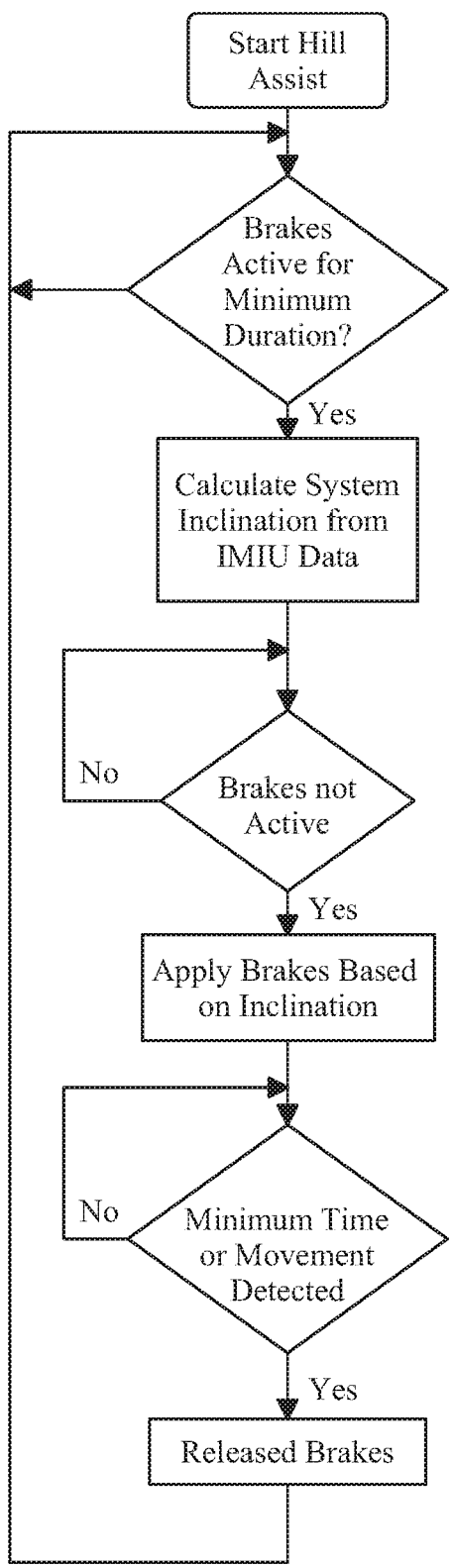
FIG. 7 is a flow chart showing a hill assist process executable by the trailer oscillation detection and stability control system of FIG. 3.

The device 10 may include a hill-assist feature, shown at 54 in FIG. 3, that keeps the tow vehicle 24 and trailer 14 from rolling downhill following tow vehicle brake release by executing the process shown in the FIG. 7 flow diagram. While a tow vehicle 24 is in an inclined position, there is a tendency for the tow vehicle 24 and trailer 14 to roll downhill when brakes 56 of the tow vehicle 24 are released. The adaptive stability control device 10 may be configured to continue to engage the trailer brakes 32 in response to tow vehicle brake release, and then to release the trailer brakes 32 upon movement detection by the IMU 20. The hill assist 54 may be connected between the IMU 20 and the brake actuation detector 38 and may be configured to command the brake controller 30 to maintain trailer brake engagement when it detects, based on IMU inputs, that trailer inclination exceeds a predetermined incline threshold value, and that, based on brake actuation detector inputs, tow vehicle brakes 56 have been released. The hill assist 54 may also be configured to command the brake controller 30 to release the trailer brakes 32 when detecting, based on IMU inputs, that a predetermined acceleration threshold has been reached or exceeded.

Figure 8:
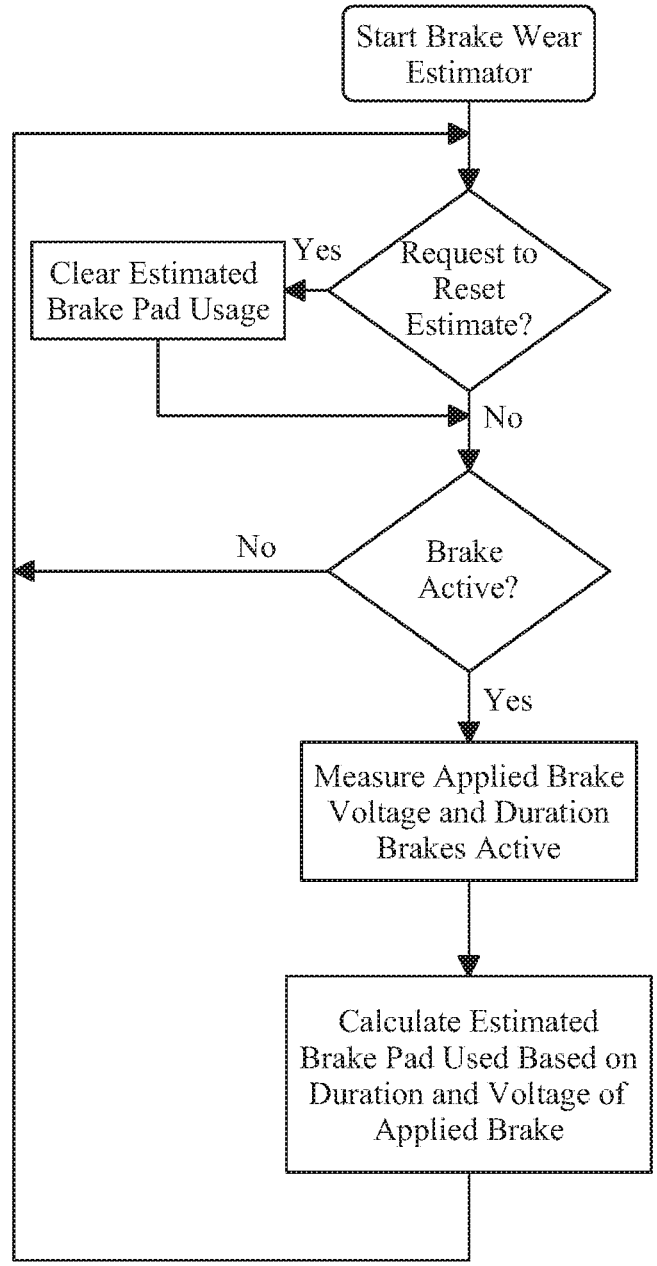
FIG. 8 is a flow chart showing a trailer brake wear estimation process executable by the trailer oscillation detection and stability control system of FIG. 3.

The device 10 may comprise a brake wear estimator, shown at 58 in FIG. 3, that may be connected to the brake actuation detector 38. As shown in the flow diagram of FIG. 8, the brake wear estimator 58 performs estimated brake wear calculations based on brake actuation data received from the brake actuation detector 38. The brake wear estimator 58 may be configured to transmit a corresponding alert to a tow vehicle operator when estimated brake wear exceeds a predetermined value.

Figure 10:
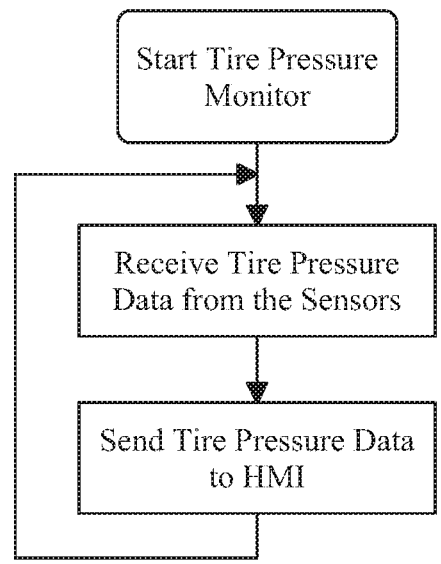
FIG. 10 is a flow chart showing a tire pressure monitoring and display process executable by the trailer oscillation detection and stability control system of FIG. 3.

The device 10 may comprise a tire pressure radio, shown at 60 in FIG. 3, configured to receive tire pressure data from tire pressure sensors 62 and to transmit corresponding tire pressure monitor RF data over a separate RF communication channel to a display visible to a tow vehicle operator as shown in the flow diagram of FIG. 10.

The device 10 may include a controller area network bus used as a field bus interface 64 in a field bus network 66 to communicate with one or more field bus instruments and/or devices 68 such as smart chassis sensors and/or remote IMU sensors, which are configured to provide a tow vehicle operator with useful information.

The brake controller 30 may be configured to command trailer brakes 32 to engage for durations and magnitudes of braking force application determined according to a predetermined value such as maximum brake application duration, minimum brake application duration, maximum braking force, minimum braking force, a data value obtained at least in part from the angular rate sensor 16, a data value obtained at least in part from the accelerometer 12, and/or a data value obtained at least in part from the trailer wheel speed sensors 34.

Figure 4:
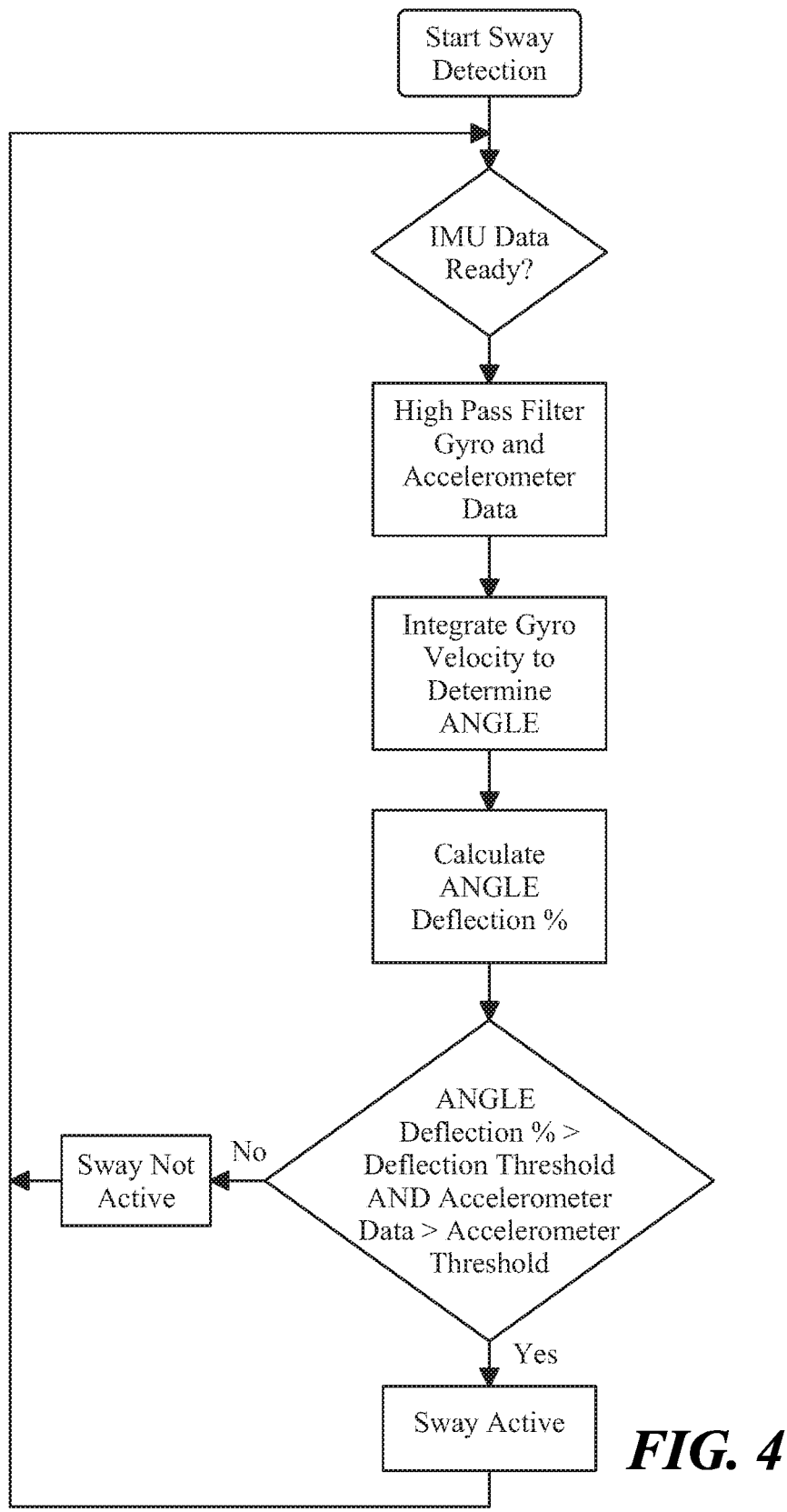
FIG. 4 is a flow chart showing an oscillation detection process executable by the trailer oscillation detection and stability control system of FIG. 3.

In practice, and as is shown in greater detail in FIG. 4, a trailer oscillation event may be detected by obtaining a trailer acceleration value from an acceleration signal received from an accelerometer 12 carried by the trailer 14, deriving an angular trailer deflection value from an angular trailer deflection rate signal received from an angular rate sensor 16 carried by the trailer 14, and determining whether the acceleration value and the angular deflection value exceed respective pre-determined threshold values.

An adaptive trailer oscillation and stability control constructed according to the invention provides improved oscillation event detection and control, applying optimum trailer brake pressure only when needed and thus avoiding unnecessary trailer brake applications and resultant reductions in tow vehicle fuel economy and accelerated trailer brake wear.

What is claimed is:

1. A trailer oscillation and stability control device comprising:
    an accelerometer configured to measure lateral acceleration of a trailer and to generate corresponding trailer lateral acceleration signals;
    an angular rate sensor configured to measure rate of angular trailer deflection about a hitch pivot point and to generate corresponding angular trailer deflection rate signals;
    an oscillation detection discriminator coupled with the accelerometer and the angular rate sensor and configured to detect oscillatory lateral trailer motion based on acceleration signals, wherein the oscillation detection discriminator is configured to detect oscillatory lateral trailer motion without taking trailer length into account received from the accelerometer and angular trailer deflection rate signals received from the angular rate sensor, and to generate corresponding oscillatory event data; and
    a brake controller configured to generate a trailer braking control signal in response to oscillatory event data received from the oscillation detection discriminator.

2. The device of claim 1 in which the oscillation detection discriminator is configured to detect oscillatory lateral trailer motion by obtaining trailer acceleration values from the acceleration signals received from the accelerometer, deriving angular trailer deflection values from the angular trailer deflection rate signals received from the angular rate sensor, and determining whether the acceleration values and angular deflection values exceed respective pre-determined threshold values.

3. The device of claim 1 in which the brake controller is configured to generate a trailer braking control signal in response to the occurrence of a predetermined number of oscillation events within a predetermined amount of time.

4. The device of claim 1 further including a proportional integral derivative (PID) controller connected between the oscillation detection discriminator and the brake controller and configured to:
    populate and amend feed-forward and gain tables using data available to the brake controller; and
    configure the brake activation signal to command a trailer wheel brake system to apply trailer braking for durations and magnitudes of braking force calculated at least in part by referencing values stored in the tables.

5. The device of claim 4 in which:
    the device includes an inertial measurement unit (IMU) comprising the accelerometer and the angular rate sensor and connected to the oscillation detection discriminator; and
    the PID controller is configured for dynamic tuned control of weighted proportional (Kp), integral (Ki), derivative (Kd), and feed forward (Ff) constants of the PID in response to vehicle dynamic response signals received from the IMU.

6. The device of claim 1 in which:
    the device comprises a brake actuation detector configured to detect trailer brake control signals generated by an external brake controller; and
    the brake controller is configured to stop sending trailer brake control signals when the brake actuation detector detects trailer brake control signals from the external brake controller.

7. The device of claim 1 including a brake output modulator connected to the brake controller and configured to modulate trailer brake control signals.

8. The device of claim 7 in which:
    the device includes a wheel spin detector connected to the brake output modulator and configured to receive trailer wheel spin data from trailer wheel speed sensors; and
    the brake modulator is configured to provide anti-lock braking control in response to signals received from the wheel spin detector.

9. The device of claim 8 in which the device is configured to determine whether one or more trailer wheels are locked by analyzing data received from the trailer wheel speed sensors and to prevent the trailer wheels from locking by adjusting braking control signals generated by the brake controller.

10. The device of claim 1 comprising a human-machine interface (HMI) comprising an HMI indicator pod.

11. The device of claim 1 comprising a Bluetooth® radio and a remote device.

12. The device of claim 1 configured to perform automatic orientation calibration.

13. The device of claim 1 in which the device comprises:
    a brake actuation detector configured to detect both tow vehicle and trailer brake control signals generated by an external brake controller; and
    a hill assist connected between the IMU and the brake actuation detector and configured to command the brake controller to maintain trailer brake engagement when detecting that trailer inclination exceeds a predetermined incline threshold value based on IMU inputs, and detecting disengagement of tow vehicle brakes based on brake actuation detector inputs; and further configured to command the brake controller to release the trailer brakes when detecting that a predetermined acceleration threshold is reached or exceeded based on IMU inputs.

14. The device of claim 1 in which the device comprises:
    a brake actuation detector configured to detect trailer brake control signals generated by an external brake controller; and
    a brake wear estimator connected to the brake actuation detector and configured to perform estimated brake wear calculations based on brake actuation data received from the brake actuation detector and to transmit a corresponding alert when estimated brake wear exceeds a predetermined value.

15. The device of claim 1 comprising a tire pressure radio configured to receive tire pressure data from tire pressure sensors and to transmit corresponding tire pressure monitor RF data.

16. The device of claim 1 including a field bus network comprising a field bus interface configured to communicate with one or more field bus devices.

17. The device of claim 1 in which the brake controller is configured to command at least one trailer brake to engage for durations and magnitudes of braking force application determined at least in part according to at least one value selected from the group of predetermined values consisting of maximum brake application duration, minimum brake application duration, maximum braking force, minimum braking force, a data value obtained at least in part from the angular rate sensor, a data value obtained at least in part from the accelerometer, or a data value obtained at least in part from the trailer wheel speed sensors.

18. The device of claim 1 in which the oscillation detection discriminator is configured to detect oscillatory trailer motion by distinguishing a trailer oscillation event from a non-oscillatory trailer deflection, based on acceleration signals received from the accelerometer and angular trailer deflection rate signals received from the angular rate sensor during a single trailer deflection.

19. The device of claim 1 in which the brake controller is configured to send a brake activation signal to the trailer brakes in response to oscillatory event data generated by the oscillation detection discriminator in response to only a single oscillation event.

20. A trailer oscillation detection method comprising the steps of:
  obtaining a trailer acceleration value from an acceleration signal received from an accelerometer carried by the trailer;
  deriving an angular trailer deflection value from an angular trailer deflection rate signal received from an angular rate sensor carried by the trailer; and
  detecting oscillatory lateral trailer motion by determining whether the acceleration value and the angular deflection value exceed respective pre-determined threshold values,
  wherein the step of detecting oscillatory lateral trailer motion is executed without taking trailer length into account.

* * * * *

UNITED STATES PATENT AND TRADEMARK OFFICE
CERTIFICATE OF CORRECTION

PATENT NO. : 11,524,663 B2  
APPLICATION NO. : 15/323561  
DATED : December 13, 2022  
INVENTOR(S) : Thomas Herman Prohaszka et al.

Page 1 of 1

It is certified that error appears in the above-identified patent and that said Letters Patent is hereby corrected as shown below:

In the Claims

Claim 1, Column 7, Lines 28-30: Move ", wherein the oscillation detection discriminator is configured to detect oscillatory lateral trailer motion without taking trailer length into account" to Column 7, Line 34 between -- oscillatory event data -- and -- ; --.

Signed and Sealed this  
Ninth Day of January, 2024

Katherine Kelly Vidal  
*Director of the United States Patent and Trademark Office*